April 15, 1958 L. K. ARMSTRONG 2,831,065
CONFERENCE CIRCUIT
Filed March 29, 1956
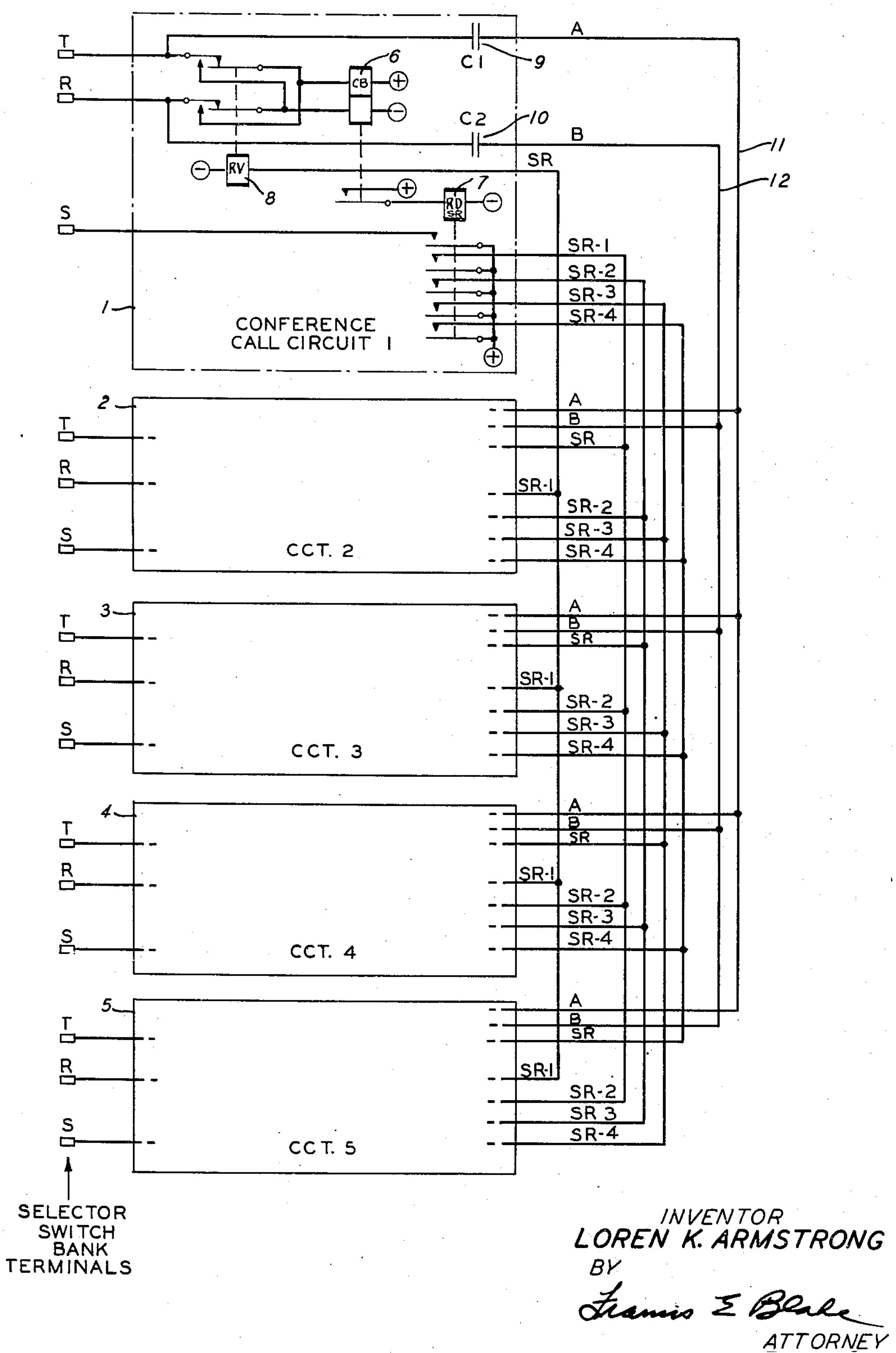
INVENTOR
LOREN K. ARMSTRONG
BY
Francis E. Blake
ATTORNEY United States Patent Office 2,831,065

Patented Apr. 15, 1958

2,831,065

CONFERENCE CIRCUIT

Loren K. Armstrong, Fairport, N. Y., assignor to General Dynamics Corporation, Rochester, N. Y., a corporation of Delaware Application March 29, 1956, Serial No. 574,831

6 Claims. (Cl. 179—18)

This invention relates to telecommunication systems and particularly to small dial telephone offices.

The object of the invention is to provide a simple special service feature common to all the subscribers thereto by which a plurality of such subscribers may congregate by appointment for conference purposes.

This invention resides in a feature of a conference circuit usable by all subscribers of a small telephone system in contradistinction to the usual conference circuit serving a coterie of important persons. The invention is characterized by means for giving a signal to any one person who has extended a connection to this common circuit when any one or more persons have also extended connections thereto. The system is popularly known as the "meet me" type of conference circuit because it is one common to all subscribers of an exchange and is used as a rendezvous after, say, an official has instructed several participants to a conference to "meet me on line so and so." Each participant may dial the conference number and, so long as there is an idle access thereto, may join the conference and may leave the conference at will. When one participant seizes a line of access to the conference circuit he will, by such act, operate a relay in each of the other circuits, and this relay will act to signal the party on any one or more of such other circuits. Thus each party to the conference is advised that there is still another party thereto or, alternatively, that he alone is left, all the others having departed.

A feature of the invention is an individual battery feed for each party to the conference with means for reversing the polarity thereof (for giving the conventional signal caused by the answering of a called party) under control of all the other conference branches. By such means any party having a connection established to such conference circuit will know at all times whether he is alone or whether there are one or more others also attending the conference. Thus each party attending the conference automatically signals each other party thereto, and thus in turn is signalled that he is alone or is in communication with another.

Another feature of the invention is the means whereby each participant to a conference controls the busy marking signal individual to the line of access which he has appropriated whereby when he releases his connection, that line of access is freed and immediately becomes available for another. Thus a participant in a conference, through his individual battery feed network, both signals other participants and controls the availability of the line of access which he uses.

Still another feature of the invention is that the group of lines of access to the conference circuit may be arranged for appropriation on an individual address basis where each line must be reached by the dialing of a specific number or on a common basis where such lines are grouped and are reached by the dialing of a single address number followed by an idle line hunting movement.

Other features will appear hereinafter.

The drawings consist of one sheet, having a single figure in the form of a schematic circuit diagram of the connections constituting the present invention.

There are five conference call circuits, number 1 being shown in some detail and numbers 2, 3, 4 and 5 being shown in the form of rectangles, the internal connections thereof being the same as shown in the circuit number 1. Each such circuit terminates at its left in the tip, ring and sleeve terminals appearing in the banks of selector switches through which these circuits may be approached and appropriated. It may be noted that these five circuits may be connected to succeeding sets of contacts in a selective switch arranged on a trunk hunting basis so that the conference circuit as a whole may be approached through the dialing of a single number followed by the automatic selection of the first idle branch thereof. On the other hand, these terminals may be arranged in other locations where each set of terminals will be approached by an individual number or they may even be terminated in jacks so that an operator may plug into the various circuit terminals.

Each conference call circuit has a CB relay, such as the relay 6, and RD relay, such as the relay 7, and an RV relay, such as the relay 8. When the conference circuit termination is seized, the CB relay 6 will act as a means for supplying battery to the calling line either with ground on the tip and battery on the ring, or reversed, with battery on the tip and ground on the ring. When the RV relay 8 is not operated as shown, the ground connection through the upper winding of the CB relay is extended through the normal upper contacts of the RV relay to the tip of the line, but when the RV relay later becomes operated then the battery connection through the lower winding of the CB relay 6 is connected through the alternate upper contacts of the RV relay 8 to the tip terminal in the switch banks. Under either condition the talking circuit from the tip and ring bank terminals extends through the C1 condenser 9 and the C2 condenser 10 to the common leads 11 and 12 respectively, by means of which the various conferees are connected for intercommunication.

The operation of the CB relay 6 results in the operation of the slow release relay 7 by an obvious circuit. This relay immediately grounds the sleeve conductor going to the selector switch bank terminals so as to mark this particular terminal as busy. At the same time it grounds the four conductors marked SR1, SR2, SR3 and SR4. These conductors are connected to similar conductors from the other conference call circuits in a network such that the SR conductor leading to the RV relay 8 is connected to the SR1 conductor of each of the circuits 2, 3, 4 and 5. Similarly, the SR conductor of circuit number 2 is connected to the SR1 conductor of circuit number 1 and the SR2 conductors of circuits 3, 4 and 5. Similarly again the SR conductor of circuit 3 is connected to the SR2 conductors of circuits 1 and 2 and the SR3 conductors of circuits 4 and 5. Similarly again the SR conductor of circuit 4 is connected to the SR3 conductors of circuits 1, 2, 3 and the SR4 conductor of circuit 5, and, lastly, the SR conductor of circuit number 5 is connected to the SR4 conductors of circuits 1, 2, 3 and 4. Thus it will be noted that when circuit number 1, by way of example, has been seized, it will result in the marking of its own circuit as busy and the operation of the RV relay in each of circuits 2, 3, 4 and 5 so that the battery feed connections of each of these circuits will be reversed. Until one of the circuits 2, 3, 4 or 5 has been seized, the battery feed connections of circuit 1 will remain as shown. Therefore, if the party who has seized this conference call circuit number 1 has means, such as the usual means for observing the answer of a called subscriber, he will be signalled that, so far, he alone is occupying the conference circuit. However, as one of these circuits 2, 3, 4 or 5 is seized, then his battery feed connection will be reversed and it will stay reversed until all of the other conferees have left the conference.

What is claimed is:

1. In a telephone system, a conference circuit having a plurality of lines of access thereto, said lines of access appearing in the terminals of selective switches used in establishing connections thereto, a separate battery feed network for connecting each said line of access to a common talking circuit, a relay for reversing the battery feed connections to the said line of access for each said network, a battery feed relay for each said network controlled over an established connection thereto, a pair of contacts controlled by each said battery feed relay for marking the said terminals of said associated line of access as busy and a separate pair of contacts controlled by each said battery feed relay for controlling the said reversing relay of each other network.

2. In a telephone system, a conference circuit having a plurality of lines of access thereto, said lines of access appearing in the terminals of selective switches used in establishing connections thereto, said switches being arranged to approach said plurality of lines through a common directive operation followed by an individual idle line hunting operation, a separate battery feed network for connecting each said line of access to an individual common talking circuit, a relay for each said network for reversing the battery feed connections to the said line of access, for each said associated network, an individual battery feed relay controlled over an established connection thereto, a pair of contacts controlled by each said battery feed relay for marking the said terminals of said associated line of access as busy, and a pair of contacts controlled by each said battery feed relay for controlling the said reversing relay of each other network.

3. In a telephone system, a conference circuit having a plurality of lines of access thereto, said lines of access appearing in the terminals of selective switches used in establishing connections thereto, each said line having an individual address, a separate battery feed network for connecting each said line of access to a common talking circuit, an individual relay for each said network for reversing the battery feed connections to the said associated line of access, an individual battery feed relay for each said network controlled over an established connection thereto, a pair of contacts controlled by each said battery feed relay for marking the said terminals of said associated line of access as busy and a pair of contacts controlled by each said battery feed relay for controlling the said reversing relay of each other network.

4. In a telephone system, a conference circuit having a plurality of lines of access thereto, a separate battery feed network for each said line of access, a relay in each said network for reversing the said battery feed therein, and means controlled by each of the other said networks for controlling said reversing relay.

5. In a telephone system, a conference circuit having a plurality of lines of access thereto, a separate battery feed network for each said line of access, a relay in each said network for reversing the said battery feed therein, and means controlled by each said network for simultaneously controlling said reversing relays of the remainder of said networks.

6. In a telephone system, a conference circuit having a plurality of lines of access thereto, a separate battery feed network for each said line of access, a common talking circuit connected through each said battery feed network to said associated line of access, an individual battery feed relay for each said network responsive to the seizure of said associated line of access, an individual reversing relay for each said network for reversing the battery feed to its said associated line of access, and a pair of contacts controlled by each said battery feed relay for operating the said reversing relay of each of the other said networks.

References Cited in the file of this patent

UNITED STATES PATENTS

| | | |
|---|---|---|
| 1,763,161 | Koechling et al. | June 10, 1930 |
| 1,888,337 | Voss | Nov. 22, 1932 |
| 2,154,579 | Parrott | Apr. 18, 1939 |

UNITED STATES PATENT OFFICE

CERTIFICATE OF CORRECTION

Patent No. 2,831,065 April 15, 1958

Loren K. Armstrong

It is hereby certified that error appears in the printed specification of the above numbered patent requiring correction and that the said Letters Patent should read as corrected below.

Column 3, line 29, strike out "an individual"; line 30, before "common" insert -- a --; same line, for "a relay" read -- an individual relay --; line 31, after "said" insert -- associated --; line 32, strike out "for each said associated network,".

Signed and sealed this 24th day of March 1959.

(SEAL)
Attest:

KARL H. AXLINE
Attesting Officer

ROBERT C. WATSON
Commissioner of Patents